(12) United States Patent
Mori et al.

(10) Patent No.: US 8,104,894 B2
(45) Date of Patent: Jan. 31, 2012

(54) VISIBLE LASER BEAM PROJECTION SYSTEM AND METHOD OF MOUNTING VISIBLE LASER BEAM PROJECTION DEVICE

(75) Inventors: Kenichi Mori, Suzuka (JP); Seiji Kawai, Aichi-gun (JP); Yoshihisa Sato, Nagoya (JP); Tetsuya Enokizaka, Nagoya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 955 days.

(21) Appl. No.: 12/055,710

(22) Filed: Mar. 26, 2008

(65) Prior Publication Data

US 2008/0239242 A1 Oct. 2, 2008

(30) Foreign Application Priority Data

Mar. 27, 2007 (JP) .................................. 2007-81202

(51) Int. Cl.
G03B 21/00 (2006.01)
(52) U.S. Cl. ........................................... 353/13; 353/14
(58) Field of Classification Search ...................... 353/12, 353/13, 14; 340/425.5, 555, 576, 426.24
See application file for complete search history.

(56) References Cited

U.S. PATENT DOCUMENTS

| | | | |
|---|---|---|---|
| 7,131,728 B2 * | 11/2006 | Nambudiri et al. | 353/13 |
| 7,275,831 B2 | 10/2007 | Knoll et al. | |
| 7,287,864 B2 * | 10/2007 | Shirasu et al. | 353/97 |
| 7,815,313 B2 * | 10/2010 | Ito et al. | 353/13 |
| 2003/0020880 A1 * | 1/2003 | Knoll et al. | 353/13 |
| 2007/0024824 A1 * | 2/2007 | Damera-Venkata et al. | 353/94 |
| 2008/0068566 A1 * | 3/2008 | Denoue et al. | 353/122 |
| 2009/0052157 A1 | 2/2009 | Katabe | |

FOREIGN PATENT DOCUMENTS

| | | |
|---|---|---|
| DE | 103 34 720 A1 | 3/2005 |
| JP | 09-210716 | 8/1997 |
| JP | 2000-168352 | 6/2000 |
| JP | 2001-312237 | 11/2001 |
| JP | 2003-165404 | 6/2003 |
| JP | 2004-262363 | 9/2004 |
| JP | 2005-157873 | 6/2005 |
| JP | 2006-290102 | 10/2006 |
| JP | 2006290102 A * | 10/2006 |
| WO | WO 2008/087832 | 7/2008 |

OTHER PUBLICATIONS

Machine Translation of Watanabe Document.*
Kawai et al.: "Visible Laser Beam Projector," U.S. Appl. No. 12/071,212, filed Feb. 19, 2008.
Mori et al.: "Visible Laser Beam Projection System," U.S. Appl. No. 12/055,736, filed Mar. 26, 2008.

(Continued)

Primary Examiner — Que T Le
Assistant Examiner — Jerry Brooks
(74) Attorney, Agent, or Firm — Nixon & Vanderhye PC (57) ABSTRACT

A visible laser beam projection system for a vehicle projects visible laser beam onto an instrument panel in a vehicle compartment. The instrument panel is provided with highly reflecting portions, which are scattered on the upper surface of the instrument panel. The highly reflecting portions having a diffuse reflectivity for the wavelength of a visible laser beam higher than that of other portions of the instrument panel. The visible laser beam is projected to the highly reflecting portions.

26 Claims, 9 Drawing Sheets

OTHER PUBLICATIONS

Konica Minolta, "Let's measure various colors by spectrophotometer," http://konicaminolta.jp/entertainment/colorknowledge/part2/0.5.html, Mar. 8, 2007, with translation, 3 pages.

U.S. Appl. No. 12/055,736 of Mori filed Mar. 26, 2008; corresponds to JP Appln No. 2007-78530.

U.S. Appl. No. 12/149,146 of Mori filed Apr. 28, 2008; corresponds to JP Appln No. 2007-141476.

PCT/JP2007/074637 of Sato filed Dec. 21, 2007, corresponds to JP Appln. No. 2007-9865 (not yet published).

Japanese Office Action dated Sep. 14, 2010 for corresponding Japanese Application No. 2007-081202 with English Translation.

* cited by examiner

VISIBLE LASER BEAM PROJECTION SYSTEM AND METHOD OF MOUNTING VISIBLE LASER BEAM PROJECTION DEVICE

CROSS REFERENCE TO RELATED APPLICATION

This application is based on and incorporates herein by reference Japanese Patent Application No. 2007-81202 filed on Mar. 27, 2007.

FIELD OF THE INVENTION

This invention relates to a visible laser beam projection system for projecting visible laser beams in a compartment of a vehicle and a method of mounting a laser beam projection device in a vehicle.

BACKGROUND OF THE INVENTION

It is proposed in for example, JP 9-210716A, to draw a picture on a road surface by projecting a visible laser beam from a front end of a vehicle onto a road surface.

SUMMARY OF THE INVENTION

It is an object of the present invention to provide a visible laser beam projection system and method of mounting a visible laser beam projection device in a vehicle so that visible laser beams can be more easily viewed by vehicle passengers.

According to one aspect, a visible laser beam projection system for a vehicle includes a laser beam projector that is mounted in the vehicle to project a visible laser beam onto an instrument panel in a compartment. The instrument panel is provided with a first surface portion and a second surface portion. The first surface portion has a first diffuse reflectivity at a projection wavelength of the visible laser beam. The second surface portion has a second diffuse reflectivity larger than the first diffuse reflectivity at the projection wavelength. The laser beam projector is mounted such that it projects the visible laser beam onto the second surface portion.

According to another aspect, a visible laser beam projection system for a vehicle includes a visible laser beam projector and a control unit. The visible laser beam projector projects a visible laser beam onto an instrument panel provided in a compartment of the vehicle. The control unit controls a direction of projection and an intensity of the visible laser beam projected by the visible laser beam projector. The control unit increases the intensity with a decrease in a diffuse reflectivity at a projection position based on data of the diffuse reflectivity at a projection wavelength at the projection position in the compartment corresponding to the projection direction.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENTS

First Embodiment

Figure 1:
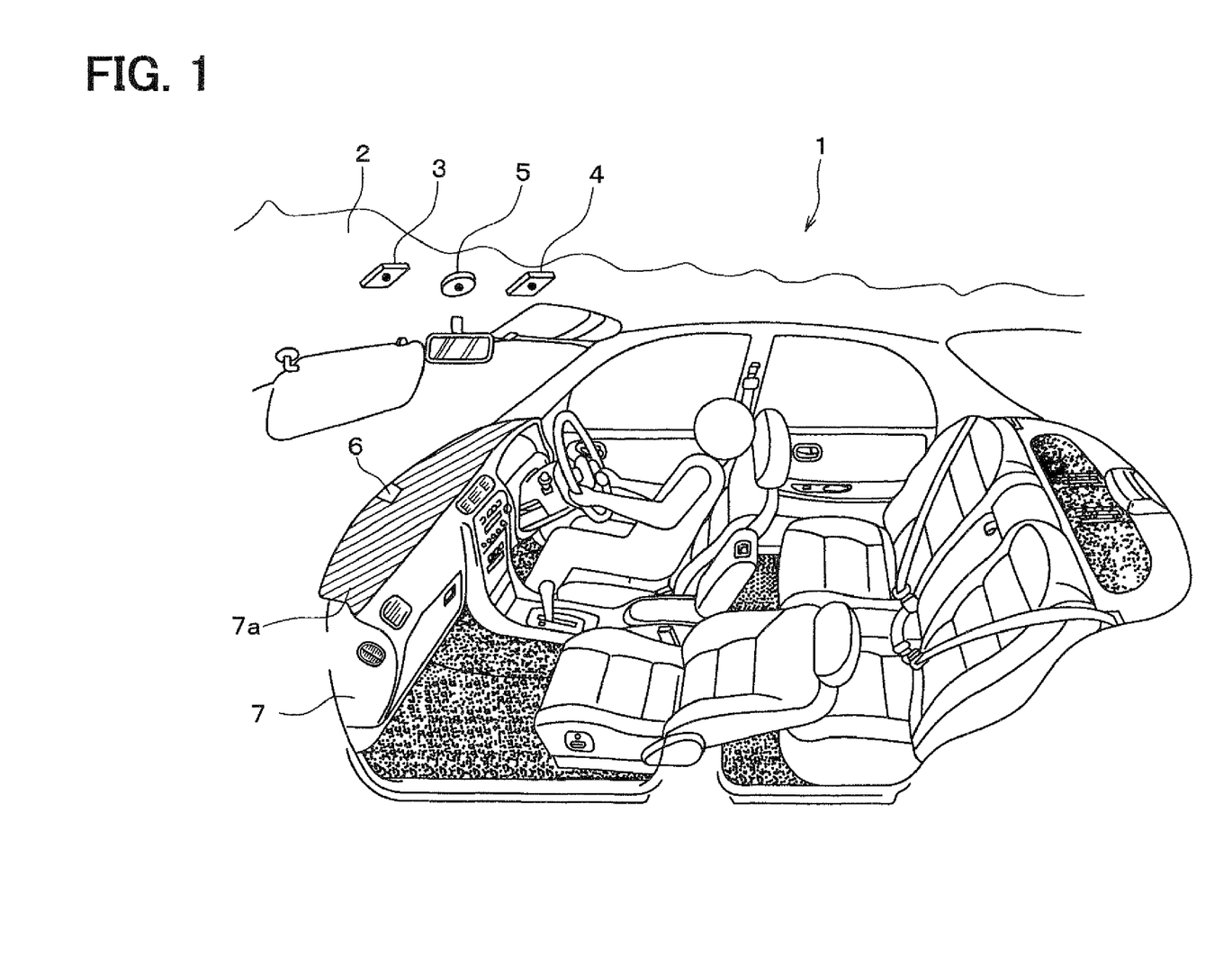
FIG. 1 is a perspective view schematically illustrating a compartment of a vehicle mounting therein a visible laser beam projection system according to a first embodiment of the present invention.
Figure 2:
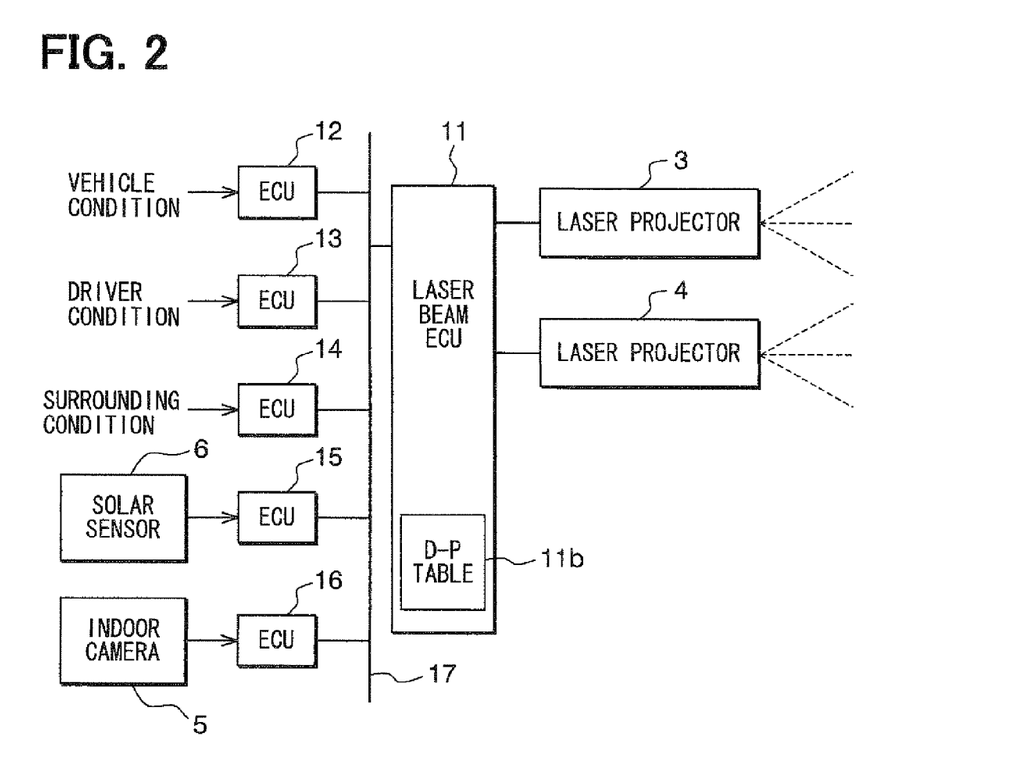
FIG. 2 is a block diagram illustrating the visible laser beam projection system according to the first embodiment.

Referring first to FIGS. 1 and 2, a visible laser beam projection system includes a laser beam projector 3, a laser beam projector 4, an indoor camera 51 a solar sensor 6, a laser beam electronic control unit (ECU) 11, various ECUs 12 to 16, and a communication line 17 for communication among the ECUs 11 to 16.

The laser beam projectors 3 and 4 for projecting visible laser beams are mounted near the front end of a ceiling portion 2 in a compartment 1 of a vehicle, so that projection of the visible laser beams can be turned on and off, and the direction of projection can be changed as controlled by the laser beam ECU 11. A mechanism for changing the directions of projection may be a motor drive mechanism. The laser beam projectors 3 and 4 are mounted near the front end of the ceiling portion 2 in the compartment 1, projection of the visible laser beams can be turned on and off, the direction-position of projection can be changed and the intensity of projection can be changed as controlled by the laser beam ECU 11. As a mechanism for changing the directions of projection, there can be, for example, a motor drive mechanism.

Figure 3:
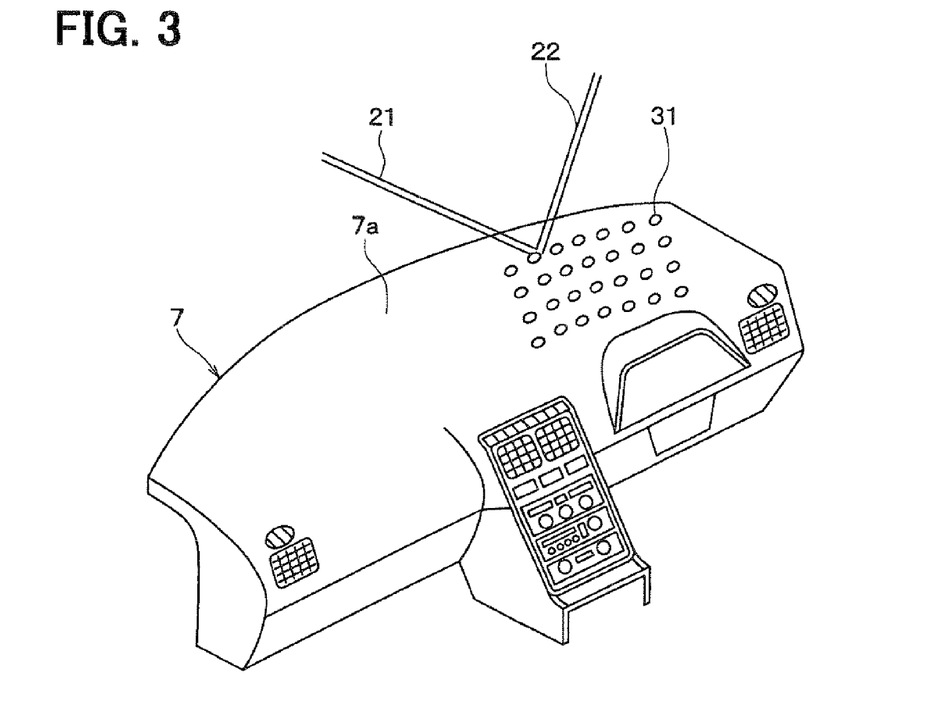
FIG. 3 is a perspective view schematically illustrating an upper surface of an instrument panel and a highly reflecting portion provided in the first embodiment.

As shown in FIG. 3, projection from the laser beam projectors 3 and 4 will be directed, for example, onto an upper surface 7a of an instrument panel 7 in the compartment 1. The visible laser beams projected by the laser beam projectors 3 and 4 are monochromatic beams. The wavelengths (projection wavelengths) of the monochromatic beams may be predetermined at the time of mounting the visible laser beam projection system, or may be varied while being controlled by the laser beam ECU 11.

The indoor camera 5 is mounted near the front end of the ceiling portion 2 in the compartment 1, repetitively takes an image of the overall positions where the visible laser beams are to be projected, such as the upper surface 7a of the instrument panel 7, and outputs an image to the ECU 16. The ECU 16 repetitively detects the positions where the visible laser beams are now being projected and the brightness of visible laser beams projected onto the projection positions from the image taken by the indoor camera 5 based on known image recognition processing, and outputs the projection positions and the brightness values that are detected to the laser beam ECU 11 as indoor camera data together with the image that is taken. In the image recognition processing, the image taken in a state where no visible laser beam is projected (for instance, at the time of mounting the visible laser beam projection system in the vehicle) may be provided for reference, and the reference image may be compared with the image in the indoor camera data that are provided to determine the projection positions.

The solar sensor 6 detects the amount of sunlight falling on the upper surface 7a of the instrument panel 7, and outputs the detected result to the ECU 15 which outputs the data related to the amount of sunlight received from the solar sensor 6 as solar sensor data to the laser beam ECU 11.

The ECU 12 calculates the data related to the condition of the vehicle (data of conditions inside and outside of the vehicle) based on the signals from various sensors (not shown) in the vehicle, and checks whether the display by the visible laser beams is necessary based on the data that are calculated. If it is determined that the display is necessary, the ECU 12 determines an object to be projected and outputs a projection start instruction signal inclusive of data of an identifier of the determined object to be projected to the laser beam ECU 11. If it is determined that the display by the visible laser beams is no longer necessary, the ECU 12 outputs a projection stop instruction signal to the laser beam ECU 11.

For example, if a condition is detected such as a door is opening, the temperature of the engine coolant water is in excess of a predetermined temperature, the remaining amount of gasoline is less than a predetermined amount, a telephone in the compartment has received a call or a bill is charged for an (electronic toll collection) ETC device mounted in the compartment, the ECU 12 determines the projection portions (for instance, right upper end, right lower end, etc. on the upper surface 7a) dependent on the detected content as the object to be projected, and outputs the projection start instruction signal inclusive of data of the identifier of the determined object to be projected to the laser beam ECU 11. If the condition serving as a cause for producing the projection start signal lasts no longer, the ECU 12 outputs the projection stop instruction signal to the laser beam ECU 11.

The ECU 13 calculates data related to the condition of the driver (data of conditions inside and outside of the vehicle) based on signals from various sensors (not shown) in the vehicle, and checks whether the display by the visible laser beams is necessary. If it is determined that the display is necessary, the ECU 13 determines an object to be projected and outputs the projection start instruction signal inclusive of data of the identifier of the determined object to be projected to the laser beam ECU 11. If it is determined that the display by the visible laser beams is no longer necessary, the ECU 13 outputs the projection stop instruction signal to the laser beam ECU 11.

For example, if a camera for taking a picture of the driver has taken a picture of the driver dozing at a steering wheel, the ECU 13 determines a conspicuous position (for instance, surface in front of the driver) on the upper surface 7a of the instrument panel as the object to be projected, and outputs the projection start instruction signal inclusive of data of the identifier of the determined object to be projected to the laser beam ECU 11. If the driver is no longer dozing at the steering wheel, the ECU 13 outputs the projection stop instruction signal to the laser beam ECU 11.

The ECU 14 calculates data related to the surrounding condition around the vehicle (data of conditions inside and outside of the vehicle) based on signals from various sensors (not shown) in the vehicle, and checks whether the display by the visible laser beams is necessary. If it is determined that the display is necessary, the ECU 14 determines an object to be projected and outputs the projection start instruction signal inclusive of data of the identifier of the determined object to be projected to the laser beam ECU 11. If it is determined that the display by the visible laser beams is no longer necessary, the ECU 14 outputs the projection stop instruction signal to the laser beam ECU 11.

For example, if an obstacle alarm device (for instance, clearance sonar, not shown) that detects and displays an obstacle around the vehicle, detects an obstacle and a distance to the obstacle, the ECU 14 determines, as an object to be projected, a portion that varies depending on the distance thereof on the upper surface 7a of the instrument panel, and outputs the projection start instruction signal inclusive of data of the identifier of the determined object to be projected to the laser beam ECU 11. If the obstacle is no longer present, the ECU 14 outputs the projection stop instruction signal to the laser beam ECU 11.

The laser beam ECU 11 stores a direction-position table 11b that defines a correspondence between direction D and position P. This direction-position table 11b has a plurality of records corresponding to various portions in the vehicle, while the records are recording (1) identifiers of object portions, (2) direction in which the laser beam projector 3 should be directed to project the visible laser beam to the object portion, and (3) direction in which the laser beam projector 4 should be directed to project the visible laser beam to the object portion.

Here, the identifier of the object portion may be a name of the object portion (for instance, upper surface 7a of the instrument panel 7, drive position lever, etc.), or may be a three-dimensional coordinate of the object portion in the vehicle compartment, or may be a combination of the name and the coordinate (for instance, two-dimensional coordinate on the upper surface 7a of the instrument panel 7). The direction-position table 11b may be provided in a storage medium of the laser beam ECU 11 at the time when the visible laser beam projection system is installed in the vehicle or when the visible laser beam projection system is being produced.

As shown in FIG. 3, the instrument panel 7 is provided with a normal reflecting portion (first surface portion) and a highly reflecting portions (second surface portion) 31, which are attached onto the upper surface 7a of the instrument panel. The highly reflecting portions 31 are arranged maintaining an equal distance like a lattice (for instance, four rows and seven columns). More specifically, the laser beam projectors 3 and 4 project the visible laser beams onto the highly reflecting portions 31.

The highly reflecting portions 31 are surrounded by the normal surface portion exposed on the upper surface 7a of the instrument panel. The highly reflecting portions 31 have a diffuse reflectivity at the projected wavelength higher than that of the upper surface 7a of the instrument panel 7.

As for a ratio of laser beam reflectivity relative to sunlight reflectivity, further, the highly reflecting portions 31 have a ratio higher than that of the upper surface 7a of the instrument panel 7. Here, the ratio of laser beam reflectivity to the sunlight reflectivity on the surface portion means a ratio RL/RS of a laser beam reflectivity RL and a sunlight reflectivity RS of the surface portion. The laser beam reflectivity RL of the surface portion means a ratio of the energy in the visible beam region of the beams reflected from the visible laser beams incident on the surface portion to the energy in the visible beam region of the visible laser beams that are incident. Further, the sunlight reflectivity RS of the surface portion means a ratio of the energy in the visible beam region of the beam reflected from the sunlight incident on the surface portion to the energy in the visible beam region of the sunlight that is incident.

In order to realize the above reflection characteristics, for example, the upper surface 7a of the instrument panel may assume, for example, a dark color system such as black, gray, brown or dark blue, whereas the highly reflecting portions 31 may assume a bright color system such as white or beige. Further, while the upper surface 7a of the instrument panel 7 has a nonmetallic color tone, the highly reflecting portions 31 may have a metallic color tone such as silver or the like. Moreover, the upper surface 7a of the instrument panel may not be luster-treated, while the highly reflecting portions 31 may be luster-treated.

The visible laser beams are projected onto the highly reflecting portions 31 having a high diffuse reflectivity at the projected wavelength, i.e., are projected onto the highly reflecting portions 31 capable of more efficiently and selectively reflecting the laser beams, so that the visible laser beams projected onto the highly reflecting portions 31 can be viewed more easily as indicated by beams 21, 22.

Further, the visible laser beams are projected onto the highly reflecting portions 31 having a high laser/sunlight reflectivity ratio, that is, being capable of more efficiently reflecting the laser beams than the sunlight, so that the visible laser beams projected onto the highly reflecting portions 31 can be viewed more easily.

In an environment where the sunlight is falling from the exterior of the vehicle, therefore, the visible laser beams projected onto the instrument panel will not become less visible due to the sunlight reflected by the instrument panel 7.

Further, the highly reflecting portions 31 tend to be more reflected onto the windshield than on the upper surface 7a of the instrument panel 7. However, the highly reflecting portions 31 are configured by a plurality of separate portions and are surrounded by the exposed portion on the upper surface 7a of the instrument panel 7. Therefore, the highly reflecting portions 31 that tend to be reflected onto the windshield are dispersed in the upper surface 7a of the instrument panel that is little reflected. Therefore, the reflected portions are dispersed in the windshield. This prevents the windshield from becoming less transparent due to the reflection.

Further, since the highly reflecting portions 31 are regularly arranged on the instrument panel 7, the scattered highly reflecting portions 31 evoke aesthetic feeling for passengers in the compartment 1.

The reflection characteristics of the highly reflecting portions 31 will be described below in further detail. When the color of the highly reflecting portions 31 is close to white, the characteristics between the wavelength and the diffuse reflectivity of the highly reflecting portions 31 become nearly constant in the visible beam region as represented by a solid line 80 in the graph of FIG. 4. Here, the characteristics between the wavelength and diffuse reflectivity represent dependency of the diffuse reflectivity of an incident beam of a given wavelength upon the incident wavelength. Here, as shown in FIG. 4, if the projection wavelength is the) one corresponding to green, then the color of the highly reflecting portions 31 is not the same as the color of the visible laser beams, enabling the visible laser beams to be more easily viewed.

Figure 4:
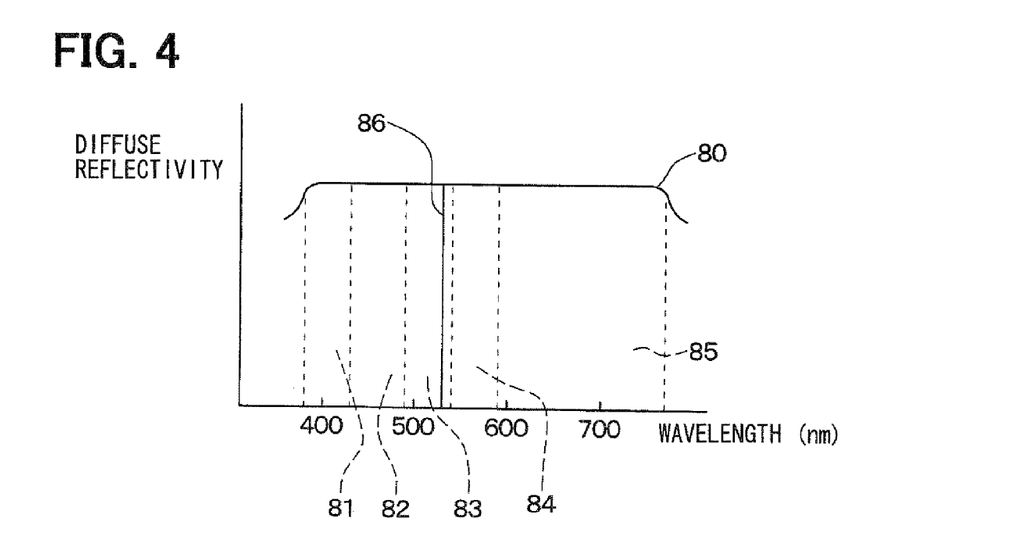
FIG. 4 is a graph showing a characteristic between a wavelength and a diffuse reflectivity in a case that the color of the highly reflecting portion is close to white in the first embodiment.

Here, as shown in FIG. 4, the visible wavelength region is divided into five sub-regions 81 to 85. These regions include a violet sub-wavelength band 81 (380 nm to 430 nm) which is a wavelength band of a violet system, a blue sub-wavelength band 82 (430 nm to 490 nm) which is a wavelength band of a blue system, a green sub-wavelength band 83 (490 nm to 550 nm) which is a wavelength band of a green system, a yellow sub-wavelength band 84 (550 nm to 590 nm) which is a wavelength band of a yellow system, and a red sub-wavelength band 85 (590 nm to 770 nm) which is a wavelength band of a red system.

Figure 5:
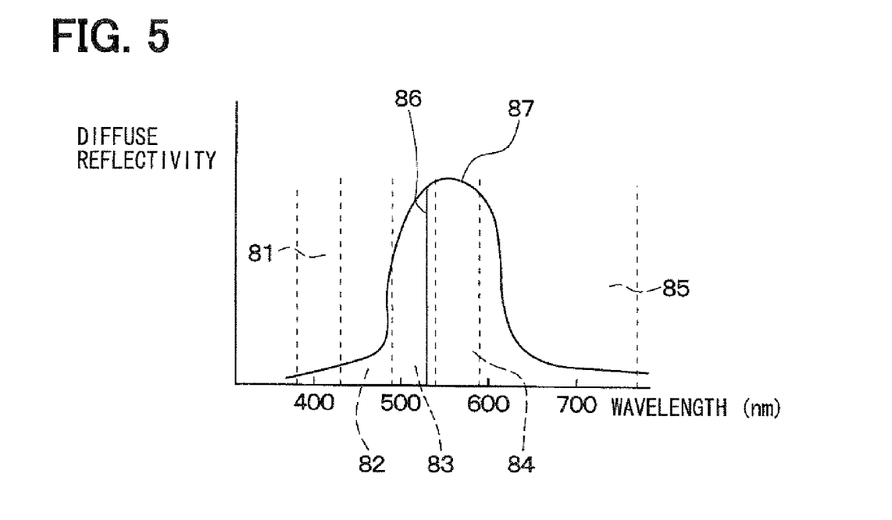
FIG. 5 is a graph showing another characteristic between a wavelength and a diffuse reflectivity in a case that the color of the highly reflecting portion.

When the above division is employed, the difference in the color becomes clear between the highly reflecting portions 31 and the visible laser beams even if the wavelength vs. diffuse reflectivity characteristics of the highly reflecting portions 31 become as represented by a solid line 87 in FIG. 5. In the wavelength vs. diffuse reflectivity characteristics 87 of FIG. 5, the diffuse reflectivities which are not smaller than 50% of the diffuse reflectivity at the projected wavelength 86 are maintained not only by the green sub-wavelength band 83 which includes the projected wavelength 86 but also by the yellow sub-wavelength band 84 adjacent the green sub-wavelength band 83, by the red sub-wavelength band 85 and by part of the blue sub-wavelength band 82. Therefore, the highly reflecting portions 31 acquire a color deviated from green which is the color of the visible laser beams. Therefore, the visible laser beams can be viewed more easily.

The above effect can be produced, if the diffuse reflectivity in at least a portion of the wavelength band of the second surface portion other than the sub-wavelength band to which the projected wavelength belongs, maintains not less than 50% of the diffuse reflectivity at the projected wavelength.

Figure 6:
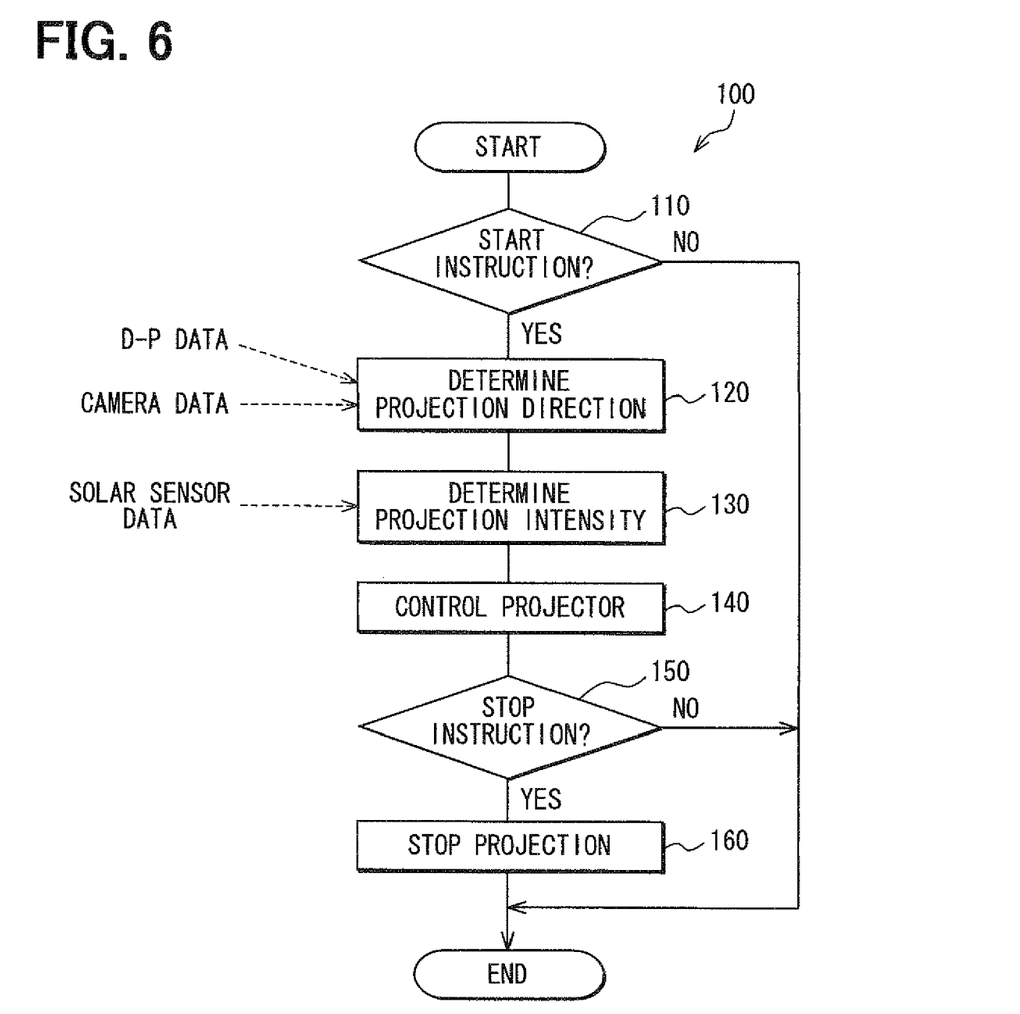
FIG. 6 is a flowchart illustrating processing executed by a laser beam ECU in the first embodiment.

The visible laser beam projection system operates as follows with its laser beam ECU 11 being programmed to execute processing 100 repetitively (for instance, every 10 milliseconds) as shown in FIG. 6.

In executing the processing 100 each time, the laser beam ECU 11 checks whether the projection start instruction signal has been received from any one of the ECUs 12 to 14 but the projection stop instruction signal has not yet been received from the above ECUs 12 to 14. If the check result is affirmative (YES), the laser beam ECU 11 executes step 120. If the check result is negative (NO), the execution of the processing 100 at this moment ends.

At step 120, an identifier of a projected object included in the projection start instruction signal is applied to the direction-position table 11b to determine the projection directions of the laser beam projector 3 and the laser beam projector 4. The positions of the object to be projected by the laser beam projector 3 and the laser beam projector 4 become the same.

At step 120, further, the projection directions determined by the direction-position table 11b are corrected based on the data of real projection positions in the indoor camera data successively received from the ECU 16. The method of correction may be a feedback method. Specifically, the projection directions of the laser beam projector 3 and the laser beam projector 4 are so corrected as to bring the present relative deviation into zero by so regarding that the amount of correction when the processing 100 was executed last time has affected a change in the relative deviation of the two projection positions, that is, has affected a change from the relative deviation of the real projection positions between the laser beam projectors 3 and 4 obtained last time into a relative deviation of the real projection positions obtained this time from the indoor camera data. The amount of correction of the first time may be a correction of a predetermined amount in a predetermined direction.

Next, at step 130, projection intensities of the laser beam projector 3 and the laser beam projector 4 are determined. Specifically, the projection intensities are controlled to increase with an increase in the amount of projection indicated by the solar sensor data received from the ECU 15.

Next, at step 140, the laser beam projectors 3 and 4 are controlled as determined at steps 120 and 130. At step 150, further, it is checked whether the projection stop instruction signal is received from the ECU that has produced the projection start instruction signal. If the projection stop instruction signal has not been received, the execution of the processing 100 of this time ends. If the projection stop instruction signal has been received, step 160 is executed so that the laser beam projectors 3 and 4 no longer project the visible laser beams. Thereafter, the execution of the processing 100 of this time ends.

The laser beam ECU 11 repeats the processing for determining the projection direction (step 120) and projection intensity (step 130) of each of the laser beam projectors 3 and 4 for projecting the object included in the projection start instruction after the receipt of the projection start instruction from any one of the ECUs 12 to 14 (step 110) until the projection stop instruction is received from the same ECU (step 150), and for causing the laser beam projector 3 and the laser beam projector 4 to project the laser beams as determined (step 140).

In determining the projection direction by repeating the processing, the laser beam ECU 11 controls the projection directions by using the data of the direction-position table 11*b*, so that the projection position of the laser beam projector 3 is brought into agreement with the projection position of the laser beam projector 4.

Since the visible laser beams are projected onto the same position by using a plurality of laser beam projectors 3, 4, the output of the individual laser beam projectors 3, 4 can be reduced as compared to when the projection position is projected by using a single laser beam projector, for the same intensities of the visible laser beams at the projection position. Therefore, even in case the human eye is brought into the path of the visible laser beam, each visible laser beam has a low intensity and is less probable to adversely affect passengers in the vehicle. As a result, safety is maintained for the human eyes and, at the same time, visibility of the visible laser beams is maintained.

More specifically, in determining the projection positions, the data of the real projection positions in the indoor camera data are successively fed back to correct relative deviation in the visible laser beam-projected positions between the laser beam projector 3 and the laser beam projector 4. This makes it possible to more precisely bring the two projection positions into agreement with each other.

In determining the projection intensities by repeating the above processing, further, the projection intensities of the laser beam projector 3 and the laser beam projector 4 are highly controlled depending upon the solar sensor data from the ECU 15, i.e., with an increase in the amount of sunlight. Thus, the intensities of the visible laser beams increase with an increase in the intensity of light from the exterior of the vehicle lowering such a probability that the visible laser beams become less visible with an increase in the intensity of light from the exterior of the vehicle.

Second Embodiment

Figure 7:
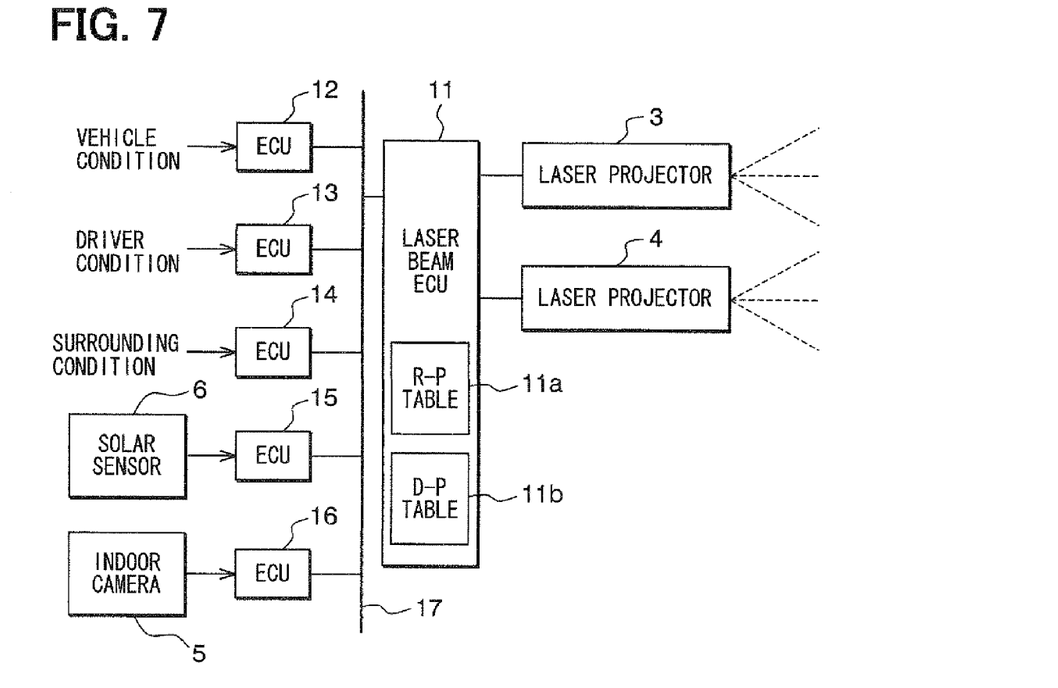
FIG. 7 is a block diagram illustrating a visible laser beam projection system according to a second embodiment of the present invention.
Figure 8:
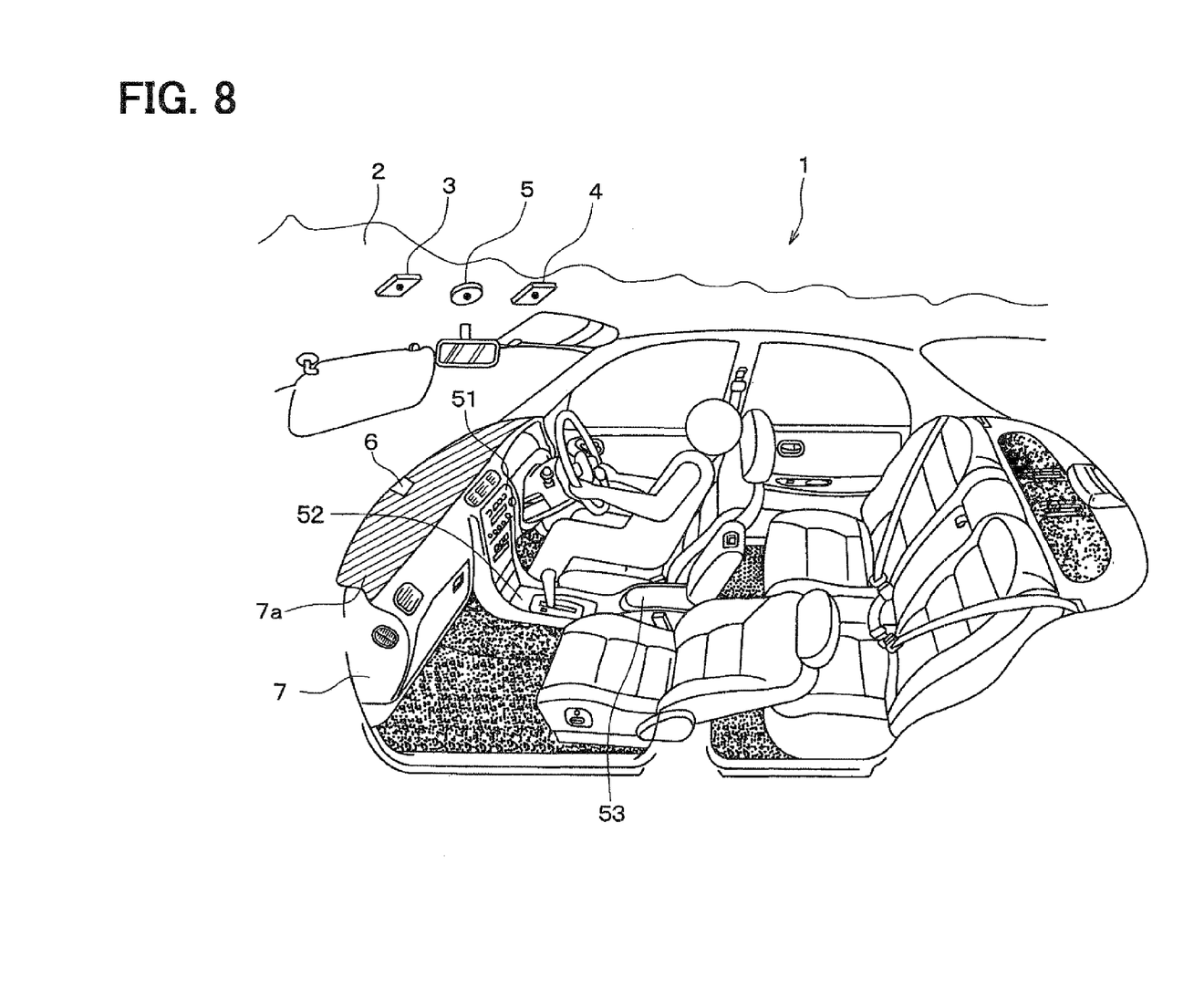
FIG. 8 is a perspective view illustrating a compartment of a vehicle mounting therein the visible laser beam projection system according to the second embodiment.

A second embodiment of a visible laser beam projection system is shown in FIGS. 7 and 8. This embodiment is different from the first embodiment with respect to the visible laser beam projection positions and that the laser beam ECU 11 is provided with a reflectivity-position table 11*a*, which defines a characteristic between the reflectivity (R) and the position (P).

In this embodiment, the laser beam ECU 11 controls the laser beam projectors 3 and 4 based on the data of conditions inside and outside of the vehicle, so that the visible laser beams are projected onto, for example, the upper surface 7*a* of the instrument panel 7, onto a manual operation portion 51, onto a drive position lever portion 52 and onto a console box portion 53 shown in FIG. 8.

The reflectivity-position table 11*a* has a plurality of records corresponding to each of the portions in the vehicle, and each record stores (1) an identifier of an object portion and (2) a diffuse reflectivity of the object to which the visible laser beams are projected at the object portion. The diffuse reflectivity means a diffuse reflection factor at the projection wavelength (for instance, a diffuse reflectivity of when the beam of the projection waveform is incident). The reflectivity-position table 11*a* is pre-stored in the storage medium of the laser beam ECU 11 at the time when the visible laser beam projection system is installed on the vehicle or at the time when the visible laser beam projection system is produced. Further, the identifier of the object portion may be a two-dimensional position coordinate in the displayed image of the indoor camera 5.

Figure 9:
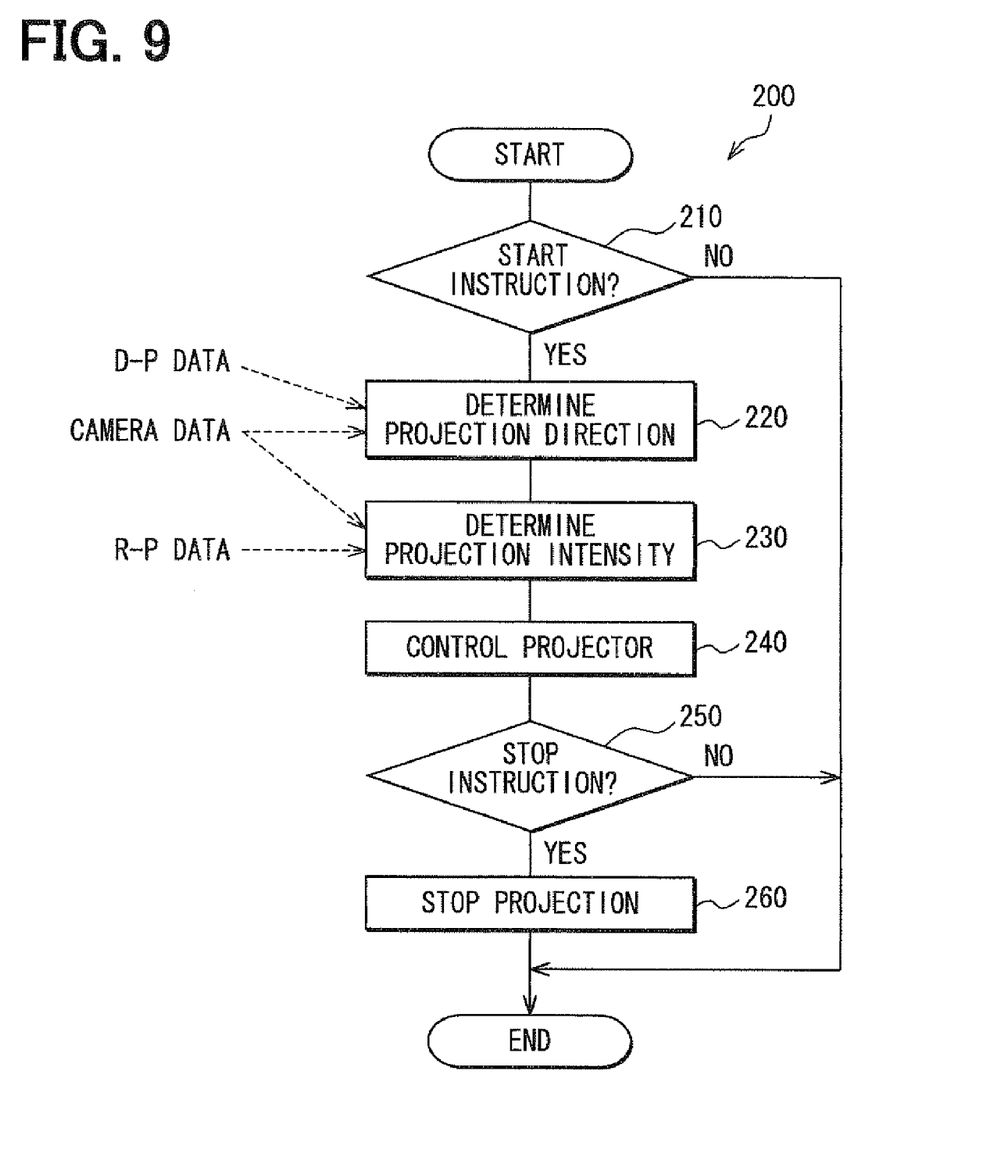
FIG. 9 is a flowchart illustrating processing executed by a laser beam ECU in the second embodiment.

The laser beam ECU 11 executes processing 200 as shown in FIG. 9. In this processing 200, the contents of steps 210, 220, 240, 250 and 260 are the same as the contents of steps 110, 120, 140, 150 and 160 of the processing 100.

At step 230, the laser beam ECU 11 determines the positions of light spots formed by the visible laser beams, that is, determines the position of the object to be projected by the laser beam projectors 3 and 4 from the image taken by the indoor camera 5 and output by the ECU 16. In the image recognition processing, the image in a state where no visible laser beam has been projected may be taken in advance (for instance, at the time of mounting the visible laser beam projection system in the vehicle) for reference, and the image taken for reference may be compared with the image in the indoor camera data that are obtained to determine the projection positions.

Next, at step 230, the data of the determined projection position (for instance, two-dimensional position coordinates in the displayed image) may be applied to the reflectivity-position table 11*a* to pick up a record having the identifier of the object portion corresponding to the determined projection position, and a diffuse reflectivity in the record that is picked up is determined as the diffuse reflectivity at the projection position.

As an example, the upper surface 7*a* of the instrument panel 7, the operation portion 51, the drive position lever portion 52 and the console box portion 53 are made of a black resin, a metallic panel, a fine-grained panel and an interior finish fabric, respectively. In this case, the diffuse reflectivity increases in order of the operation portion 51, the drive position lever portion 52, the console box portion 53 and the upper surface 7a of the instrument panel.

At step 230, further, the projection intensity at the projection position is determined depending on the relationship in that the projection intensity decreases with an increase in the determined diffuse reflectivity.

As described above, the laser beam ECU 11 repeats the processing for determining the projection direction (step 220) and the projection intensity (step 230) of each of the laser beam projectors 3 and 4 for projecting the object included in the projection start instruction after the receipt of the projection start instruction from any one of the ECUs 12 to 14 (step 210) until the projection stop instruction is received from the same ECU (step 250), and for causing the laser beam projector 3 and the laser beam projector 4 to project the laser beams as determined (step 240).

In determining the projection intensities of the laser beam projectors 3 and 4 by repeating the above processing, further, the projection positions of the laser beam projector 3 and the laser beam projector 4 are detected based on the image in the indoor camera data obtained from the ECU 16, and the detected projection position is applied to the reflectivity-position table 11a to determine the diffuse reflectivity at the projection wavelength at the position. The projection intensities of the laser beam projectors 3 and 4 are decreased with an increase in the determined diffuse reflectivity.

As described above, the projection intensities of the laser beam projectors 3 and 4 are decreased with an increase in the diffuse reflectivity. At the projection positions in the compartment 1, therefore, the intensities of the visible laser beams that are projected increase with a decrease in the diffuse reflectivity. This reduces dispersion in the intensities of the beams reflected from the visible laser beams. Therefore, passengers are capable of more easily viewing the visible laser beams at the projection position. This, further, makes it possible to determine the projection position by using the camera 5 and to adjust the brightness of projection at the determined projection position.

Third Embodiment

Figure 10:
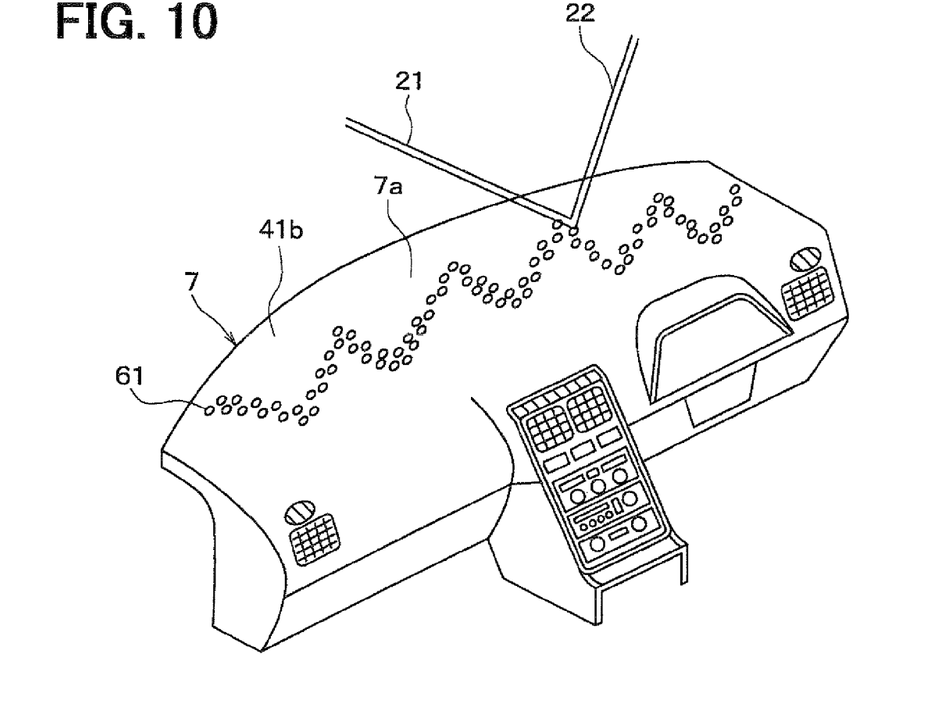
FIG. 10 is a perspective view illustrating a highly reflecting portion provided in a visible laser beam projection system according to a third embodiment of the present invention.

In a third embodiment, as shown in FIG. 10, a highly reflecting portions (second surface portion) 61 having a diffuse reflectivity at the projection waveform higher than that of the upper surface 7a of the instrument panel, are attached to the upper surface 7a of the instrument panel 7. Here, the highly reflecting portions 61 have the same reflection characteristics as those of the highly reflecting portions 31 of the first embodiment.

The highly reflecting portions 61 are arranged on the upper surface 7a of the instrument panel 7 regularly and maintained at an equal distance, and are surrounded by the exposure portion on the upper surface 7a of the instrument panel like the highly reflecting portions 31. Here, however, the arrangement of micro-scales is different from that of the highly reflecting portions 31. Though the highly reflecting portions 61 where the visible laser beams are to be projected are arranged as described above, the same advantage as that of the first embodiment is produced when the visible laser beams are projected onto the highly reflecting portions.

Fourth Embodiment

Figure 11:
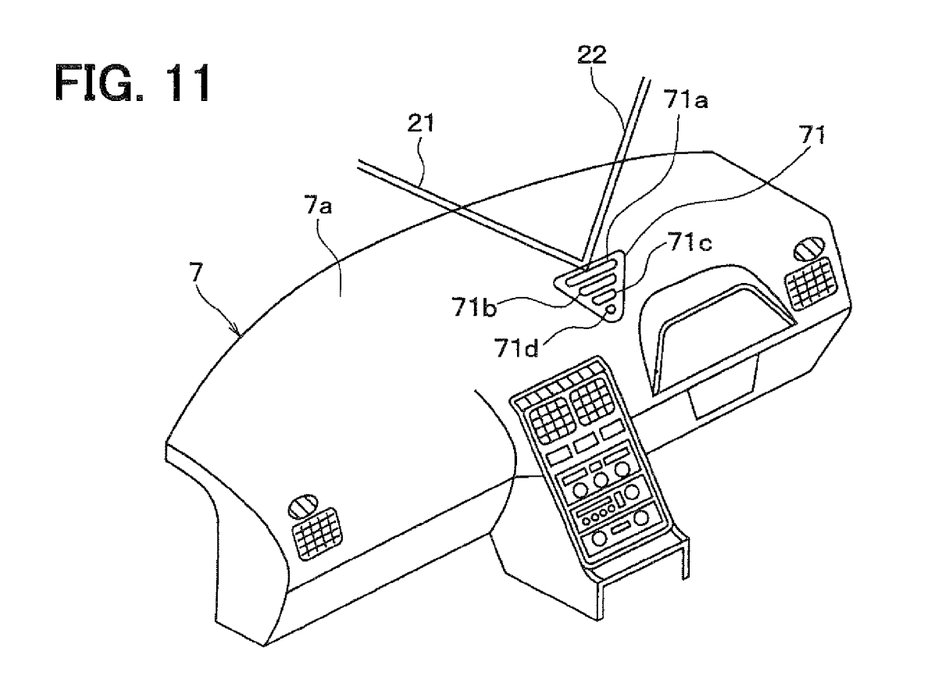
FIG. 11 is a perspective view illustrating an obstacle distance display portion provided in a visible laser beam projection system according to a fourth embodiment of the present invention.

In a fourth embodiment, as shown in FIG. 11, an obstacle distance display portion 71 is attached to the upper surface 7a of the instrument panel 7. The display portion 71 has highly reflecting portions 71a to 71d having a diffuse reflectivity at the projection waveform higher than that of the upper surface 7a of the instrument panel 7. Here, the highly reflecting portions 71a to 71d have the same reflection characteristics as those of the highly reflecting portions 31 of the first embodiment.

The ECU 14 divides the distance to the obstacle determined by the output of the obstacle sensor into four stages depending upon the distance, and determines the whole highly reflecting portion 71a as an object to be projected when it belongs to the step of the longest distance, and changes the projected object to be the highly reflecting portions 71b, 71c and 71d, successively, as the stage to which the object belongs changes to the one having shorter distances, successively. The laser beam ECU 11 controls the laser beam projector 3 and the laser beam projector 4 according to the change.

Though the highly reflecting portions 71a to 71d where the visible laser beams are to be projected are arranged as described above, the same advantage as that of the first embodiment is produced.

Fifth Embodiment

Figure 12:
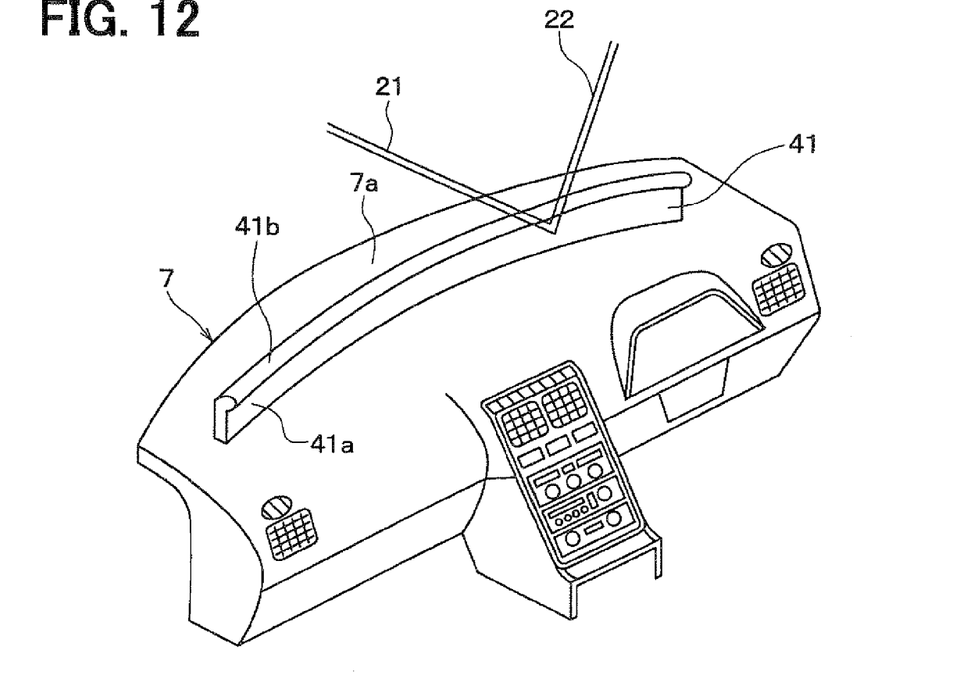
FIG. 12 is a perspective view schematically illustrating an upper surface of an instrument panel and a standing wall provided in a visible laser beam projection system according to a fifth embodiment of the present invention.

In a fifth embodiment, as shown in FIG. 12, a standing wall 41 is provided on the upper surface 7a of the instrument panel 7 instead of sticking the highly reflecting portions 31. The standing wall 41 is arranged on the upper surface 7a of the instrument panel 7 from near the left end thereof through up to near the right end thereof, and protrudes upward nearly vertically from the upper surface 7a of the instrument panel 7. Further, a canopy 41b is formed at the upper end of the standing wall 41 swelling toward the passenger side. The laser beam ECU 11 so controls the laser beam projectors 3 and 4 that the visible laser beams are projected onto the side surface 41a (projection surface 41a as the second surface portion) of the standing wall 41 on the passenger side.

The whole projection surface 41a has reflection characteristics concerning wavelengths which are the same as those of the highly reflecting portions 31 of the first embodiment. Alternatively, the portions having the same reflection characteristics concerning the wavelength as those of the highly reflecting portions 31 may be those plurality of portions regularly and separately arranged on the projection surface 41a.

Figure 13:
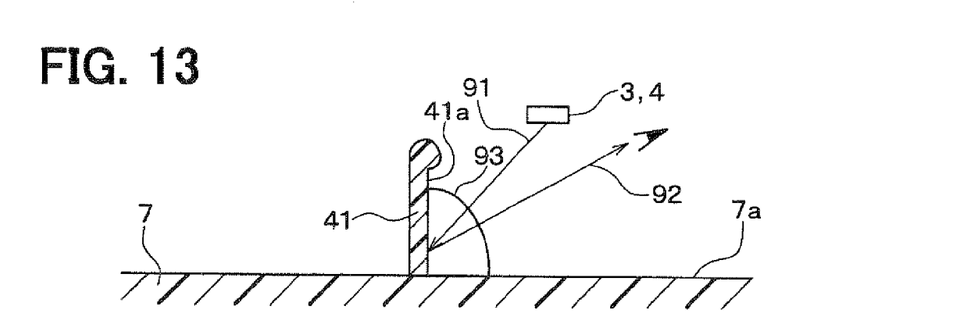
FIG. 13 is a sectional view schematically illustrating reflection characteristics of a projection surface in the fifth embodiment.

The standing wall 41 provides the reflection characteristics of projection surface 41a concerning the direction as shown in FIG. 13. An arrow 91 represents a direction of the visible laser beams incident on the projection surface 41a from the laser beam projectors 3 and 4, and an arrow 92 represents a direction to near a designed (i.e., predetermined imaginary) head direction of the driver. A solid line 93 represents angle-reflectivity characteristics of the generally vertical projection surface 41a of when the visible laser beams are incident from the projection direction 91. As shown, the diffuse reflectivity of the standing wall 41 toward the front of the vehicle is very lower than the diffuse reflectivity of the standing wall 41 on the passenger side, i.e., in the direction 92 of the driver.

Provision of the standing wall 41 almost eliminates the reflection of visible laser beams in the windshield. Formation of the canopy 41b further decreases the probability of reflection of the visible laser beams in the windshield.

Sixth Embodiment

Figure 14:
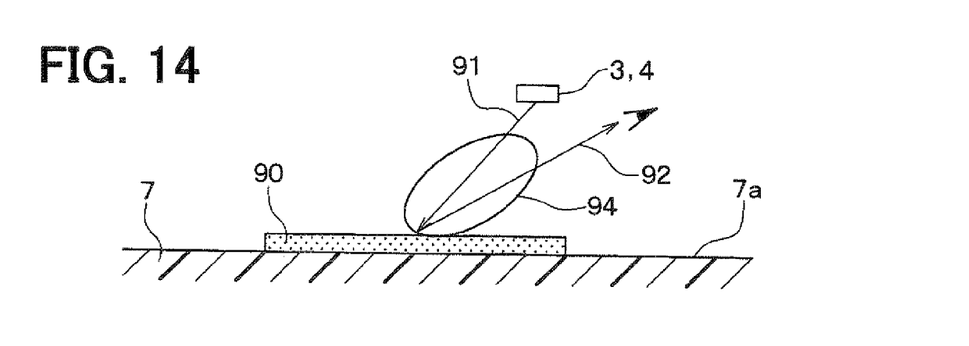
FIG. 14 is a sectional view schematically illustrating reflection characteristics of a hologram provided in a visible laser beam projection system according to a sixth embodiment of the present invention.

In a sixth embodiment, as shown in FIG. 14, a hologram 90 as the second surface portion is attached to the upper surface 7a of the instrument panel 7 instead of the highly reflecting portions 31. The hologram 90 has reflection characteristics concerning the wavelength which are the same as those of the highly reflecting portions 31.

The hologram 90 is produced in advance according to a known technology so as to possess emission characteristics as represented by a solid line 94 for the visible laser beams incident in a projection direction 91. That is, the visible laser beams incident in the projection direction 91 are strongly reflected in only an angular range of the driver direction 92 and the vicinities thereof, but are rarely reflected in other angular ranges.

The visible laser beams projected onto the hologram 90 enter more effectively into the driver's eyes.

Other Embodiments

The above embodiments may be modified in many ways.

For example, the indoor camera 5 may not take images of all positions where the visible laser beams are projected. In this case, the direction of taking images may be controlled by the laser beam ECU 11 or the ECU 16 so as to take images of the projection positions of the laser beam projectors 3, 4 and the vicinities thereof.

In the second embodiment, further, the laser beam ECU 11 at step 230 may detect the brightness at the projection positions imaged by the camera 5 and may increase the projection intensity as the detected brightness decreases. Thus, use of the camera 5 makes it possible to obtain data related to the diffuse reflectivity at the projection positions in the compartment corresponding to the projection directions even without using the reflectivity-position table 11a.

Further, the visible laser beams projected by the laser beam projectors 3 and 4 do not necessarily have to be monochromatic beams. In this case, the projection wavelength means a wavelength that becomes a peak in an intensity-wavelength characteristic of the visible laser beams. When there is a plurality of wavelengths that become peaks, however, an average value of peak wavelengths is regarded as the projection wavelength.

Further, the visible laser beam projected by the laser beam projector 3 and the visible laser beam projected by the laser beam projector 4 may be of the same color or different colors. If the colors are different, the second surface portion of the invention should have reflection characteristics as described above for the projection wavelength corresponding to at least one of the colors. This enables the passenger to easily view the visible laser beam of at least the above color.

Further, the same position does not necessarily have to be projected by the two laser beam projectors 3 and 4. Only one laser beam projector may be used to project. Alternatively, three or more laser beam projectors may be used to project the beams onto the same position.

At step 230 in the second embodiment, further, the name of the object at the projection position (for instance, operation portion 51, drive position lever portion 52, console box portion 53, etc.) may be determined by using a predetermined image recognition technology prior to applying the determined projection position to the reflectivity-position table 11a, and the name may be applied to the reflectivity-position table 11a as an identifier of the object portion corresponding to the projection position to thereby determine the diffuse reflectivity at the projection position.

In the above embodiments, the object to be projected is determined by the ECUs 12 to 14. Not being limited thereto only, however the laser beam ECU 11 may obtain data inside and outside of the vehicle from the ECUs 12 to 14, and may determine the object to be projected based on the thus obtained data inside and outside of the vehicle.

The laser beam projectors 3 and 4 may be mounted at any positions without being limited to the ceiling portion 2 if the visible laser beams can be projected in the compartment 1. Further, the position where the indoor camera 5 is mounted is not limited to the ceiling portion 2 but may be any place as long as an image of the face of the driver 9 can be taken.

What is claimed is:

1. A visible laser beam projection system for a vehicle, said system comprising:
    an instrument panel mounted in a compartment of the vehicle;
    a laser beam projector mounted in the vehicle to project a visible laser beam onto the instrument panel;
    a first surface portion provided on the instrument panel and having a first diffuse reflectivity at a projection wavelength of the visible laser beam projected by the laser beam projector; and
    a plurality of separated second surface portions provided on the instrument panel and having a second diffuse reflectivity larger than the first diffuse reflectivity at the projection wavelength,
    wherein the laser beam projector controllably projects the visible laser beam onto at least one of the second surface portions,
    the separated second surface portions are surrounded by the first surface portion, and
    the laser beam projector controls a direction of projection of the visible laser beam to project the visible laser beam onto at least one specific portion among the plurality of separate second surface portions.

2. The system according to claim 1, wherein, in a case that a visible beam wavelength band is divided into five sub-wavelength bands of a violet sub-wavelength band, a blue sub-wavelength band, a green sub-wavelength band, a yellow sub-wavelength band and a red sub-wavelength band, a wavelength characteristic of the diffuse reflectivity of the second surface portion is such that the diffuse reflectivity of the second surface portion is more than 50% of the diffuse reflectivity at the projection wavelength in at least a portion of a wavelength band other than a sub-wavelength band to which the projection wavelength belongs.

3. The system according to claim 1, wherein the plurality of separate second surface portions are regularly arranged in the first surface portion on the instrument panel, and the laser beam projector includes two projection means configured to project each of two respectively corresponding visible laser beams in different directions towards the same selected at least one specific second surface portion.

4. The system according to claim 1, wherein each second surface portion is so arranged that, in a dependency of reflectivity of the visible laser beam on a direction of reflection, the reflectivity is higher in a region inclusive of a direction to a head of a driver in the compartment than in any other direction.

5. The system according to claim 4, wherein the instrument panel has a protruding portion protruding upward from an upper surface thereof, and a surface of the protruding portion on a passenger side carries the plurality of second surface portions.

6. A method of mounting a laser beam projection device in a vehicle having an instrument panel, which has a first surface portion having a first diffuse reflectivity at a projection wavelength of a visible laser beam projected by a laser beam projector and a plurality of separated second surface portions having a second diffuse reflectivity larger than the first diffuse reflectivity at the projection wavelength, the method comprising:
  mounting the laser beam projector to project the visible laser beam onto at least one of a plurality of separated second surface portions which are each surrounded by the first surface portion; and
  controlling a direction of projection of the visible laser beam to project the visible laser beam onto at least one specific portion among the plurality of separate second surface portions.

7. A visible laser beam projection system for a vehicle, said system comprising:
  a laser beam projector mounted in the vehicle to project a visible laser beam onto an instrument panel provided in a compartment of the vehicle, the instrument panel having a first surface portion of a first diffuse reflectivity at a projection wavelength of the visible laser beam and a plurality of separated second surface portions of a second diffuse reflectivity larger than the first diffuse reflectivity at the projection wavelength; and
  a control unit for controlling a direction of projection of the visible laser beam from the visible laser beam projector,
  wherein the control unit controls the laser beam projector to project the visible laser beam onto at least one of the second surface portions of the instrument panel,
  the second surface portions are surrounded by the first surface portion, and
  the control unit controls the direction of projection of the visible laser beam to project the visible laser beam onto at least one specific portion among the plurality of separate second surface portions.

8. A visible laser beam projection system for a vehicle, said system comprising:
  an instrument panel provided in a compartment of the vehicle; and
  a laser beam projector mounted in the vehicle to project a visible laser beam onto the instrument panel,
  wherein the instrument panel has:
    a first surface portion having a first laser/sunlight reflectivity ratio RL/RS between two reflectivity RL and RS, the reflectivity RL indicating energy in the visible beam region of beam reflected from an incident visible laser beam relative to energy in the visible beam region of incident visible laser beam, and the reflectivity RS indicating energy in the visible beam region of beam reflected from incident sunlight relative to energy in the visible region of the incident sunlight; and
    a plurality of separated second surface portions having a second laser/sunlight reflectivity ratio larger than the first laser/sunlight reflectivity ratio, and
  the laser beam projector being configured to project the visible laser beam onto at least one of the second surface portions,
  the second surface portions each being surrounded by the first surface portion, and
  the laser beam projector being configured to control a direction of projection of the visible laser beam to project the visible laser beam onto at least one specific portion among the plurality of separate second surface portions.

9. A method of controlling a laser beam projection device in a vehicle having an instrument panel that includes a first surface portion and a plurality of separated second surface portions, the first surface portion having a first laser/sunlight reflectivity ratio RL/RS between two reflectivity RL and RS, the reflectivity RL indicating energy in the visible beam region of beam reflected from an incident visible laser beam relative to energy in the visible beam region of incident visible laser beam, and the reflectivity RS indicating energy in the visible beam region of beam reflected from incident sunlight relative to energy in the visible region of the incident sunlight, and the second surface portions having a second laser/sunlight reflectivity ratio larger than the first laser/sunlight reflectivity ratio, the method comprising:
  mounting the laser beam projector in the vehicle to project the visible laser beam onto any one of the second surface portions, the second surface portions each being surrounded by the first surface portion; and
  controlling a direction of projection of the visible laser beam to project the visible laser beam onto at least one specific portion among the plurality of separate second surface portions.

10. A visible laser beam projection system for a vehicle, said system comprising:
  a laser beam projector mounted in a vehicle to project a visible laser beam onto an instrument panel provided in a compartment of the vehicle, the instrument panel having a first surface portion and a plurality of separated second surface portions; and
  a control unit for controlling direction of the visible laser beam projected from the laser beam projector,
  wherein the control unit controls the laser beam projector to project the visible laser beam onto a second surface portion which has a laser/sunlight reflectivity ratio higher than that of the first surface portion,
  the laser/sunlight reflectivity ratio being defined as a ratio RL/RS between two reflectivity RL and RS, the reflectivity RL indicating energy in the visible beam region of beam reflected from an incident visible laser beam relative to energy in the visible beam region of incident visible laser beam, and the reflectivity RS indicating energy in the visible beam region of beam reflected from incident sunlight relative to energy in the visible region of the incident sunlight,
  each of the second surface portions are surrounded by the first surface portion, and
  the control unit controls a direction of projection of the visible laser beam to project the visible laser beam onto at least one specific portion among the plurality of separate second surface portions.

11. A visible laser beam projection system for a vehicle, said system comprising:
  a laser beam projector mounted in the vehicle to project a visible laser beam onto an instrument panel provided in a compartment of the vehicle; and
  a control unit for controlling a direction of projection and an intensity of the visible laser beam projected by the visible laser beam projector,
  wherein the control unit is configured to increase the intensity with a decrease in a diffuse reflectivity at a projection position based on data of the diffuse reflectivity at a projection wavelength at the projection position in the compartment corresponding to the projection direction,
  the instrument panel includes a plurality of separated portions, and
  the control unit controls a direction of projection of the visible laser beam to project the visible laser beam onto at least one specific portion among the plurality of separated portions.

12. The system according to claim 11, further comprising:
  a camera for taking an image of an interior of the compartment, wherein the control unit is configured to determine the projection position based on the image taken by the camera, and applies a determined projection position to data of predetermined correspondence between the diffuse reflectivity and the projection position in the compartment to determine the diffuse reflectivity at the projection wavelength.

13. The system according to claim 11, further comprising:
a camera for taking an image of an interior of the compartment,
wherein the control unit is configured to detect brightness at the projection position imaged by the camera, and increase the projection intensity with a decrease in detected brightness.

14. The system according to claim 1, further comprising:
a control unit for controlling a projection intensity of the visible laser beam projected from the laser beam projector; and
an external beam sensor for detecting an intensity of beam falling in a compartment of the vehicle from an exterior of the vehicle,
wherein the control unit is configured to increase the projection intensity with an increase in the intensity of the beam detected by the external beam sensor.

15. A visible laser beam projection system for a vehicle comprising:
a first laser beam projector mounted in the vehicle to project a first visible laser beam in a compartment of the vehicle;
a second laser beam projector mounted in the compartment of the vehicle at a position different from that of the first laser beam projector;
a control unit configured to control the first laser beam projector and the second beam projector to project the first visible laser beam and the second visible laser beam toward a same projection position in the compartment; and
a camera for taking an image of an interior of the compartment,
wherein the control unit includes a storage medium for storing direction-position correspondence data representing a correspondence between the projection direction of the first laser beam projector and the projection position in the compartment where the first visible laser beam is projected, and a correspondence between the projection direction of the second laser beam projector and the projection position in the compartment where the second visible laser beam is projected; and
the control unit is configured to:
detect the projection position in the compartment where the first visible laser beam is projected and the projection position in the compartment where the second visible laser beam is projected based on the image of the interior of the compartment taken by the camera and to provide detected results representative of such detected positions; and
correct the projection directions of the first visible laser beam and the second visible laser beam based on the detected results, so that if there is a detected difference in the detected positions, the projection position in the compartment where the first visible laser beam is projected are controlled toward agreement with the projection position in the compartment where the second visible laser beam is projected.

16. The system according to claim 1, wherein the laser beam projector is configured to:
obtain or calculate information about an interior and an exterior of the vehicle;
specify the specific portion dependent on the information; and
change the direction to project the visible laser beam onto the specified specific portion.

17. The method according to claim 6, further comprising:
obtaining or calculating information about an interior and an exterior of the vehicle;
specifying the specific portion dependent on the information; and
changing the direction to project the visible laser beam onto the specified specific portion.

18. The system according to claim 7, wherein the control unit is configured to:
obtain or calculate information about an interior and an exterior of the vehicle;
specify the specific portion dependent on the information; and
change the direction to project the visible laser beam onto the specified specific portion.

19. The system according to claim 8, wherein the laser beam projector is configured to:
obtain or calculate information about an interior and an exterior of the vehicle;
specify the specific portion dependent on the information; and
change the direction to project the visible laser beam onto the specified specific portion.

20. The method according to claim 9, further comprising:
obtaining or calculating information about an interior and an exterior of the vehicle;
specifying the specific portion dependent on the information; and
changing the direction to project the visible laser beam onto the specified specific portion.

21. The system according to claim 10, wherein the control unit is configured to:
obtain or calculate information about an interior and an exterior of the vehicle;
specify the specific portion dependent on the information; and
change the direction to project the visible laser beam onto the specified specific portion.

22. The system according to claim 11, wherein the control unit is configured to:
obtain or calculate information about the interior and an exterior of the vehicle;
specify the specific portion dependent on the information; and
change the direction to project the visible laser beam onto the specified specific portion.

23. The system according to claim 15, wherein the control unit is configured to:
obtain or calculate information about an interior and an exterior of the vehicle;
specify a specific portion onto which the laser beam projector projects the visible laser beam dependent on the information; and
change the projection directions to project the first visible laser beam and the second visible laser beam onto the specified specific portion.

24. The system according to claim 23, wherein the control unit is configured to correct the projection directions to bring a relative deviation between the projection position in the compartment where the first visible laser beam is projected and the projection position in the compartment where the second visible laser beam is projected to zero.

25. The system according to claim 24, further comprising:
an instrument panel mounted in the compartment of the vehicle;
a first surface portion provided on the instrument panel and having a first diffuse reflectivity at a projection wavelength of the visible laser beam projected by the laser beam projector; and
a plurality of separated second surface portions provided on the instrument panel, each having a second diffuse reflectivity larger than the first diffuse reflectivity at the projection wavelength,
wherein the second surface portions are each surrounded by the first surface portion, and
the control unit controls a direction of projection of the visible laser beam to project the visible laser beam onto a specific portion among the plurality of separate portions.

26. The system according to claim 1, wherein the laser beam projector selects one portion from the plurality of separate portions dependent on provided information and controls the direction to project the visible laser beam onto the specific portion to notify an occupant of the vehicle of the provided information.

* * * * *